(12) United States Patent  
Kilmer et al.

(10) Patent No.: US 7,407,713 B2
(45) Date of Patent: Aug. 5, 2008

(54) SIMULTANEOUS MULTI-ALLOY CASTING

(75) Inventors: Raymond J. Kilmer, Lancaster, PA (US); James L. Kirby, Delmont, PA (US)

(73) Assignee: Alcoa Inc., Pittsburgh, PA (US)

( * ) Notice: Subject to any disclaimer, the term of this patent is extended or adjusted under 35 U.S.C. 154(b) by 400 days.

(21) Appl. No.: 10/744,971

(22) Filed: Dec. 22, 2003

(65) Prior Publication Data

US 2004/0137257 A1 Jul. 15, 2004

Related U.S. Application Data

(62) Division of application No. 10/004,041, filed on Oct. 23, 2001, now Pat. No. 6,705,384.

(51) Int. Cl.
*B32B 15/20* (2006.01)
*B32B 15/01* (2006.01)
*B23K 35/22* (2006.01)
*B22D 19/04* (2006.01)
*B22D 19/16* (2006.01)

(52) U.S. Cl. .................. 428/654; 428/577; 228/56.3
(58) Field of Classification Search ................. 428/615, 428/650, 654, 577
See application file for complete search history.

(56) References Cited

U.S. PATENT DOCUMENTS

| 927,062 | A | * | 7/1909 | Monnot | 164/96 |
| 929,687 | A | * | 8/1909 | Monnot | 428/636 |
| 1,011,430 | A | * | 12/1911 | Henry | 164/96 |
| 1,423,654 | A | * | 7/1922 | Engel, Sr. | 164/96 |
| 2,174,733 | A | * | 10/1939 | Chace | 428/641 |
| 2,268,565 | A | * | 1/1942 | Chace | 428/674 |
| 2,715,252 | A |   | 8/1955 | Schaefer et al. | 22/57.2 |
| 2,895,893 | A |   | 7/1959 | Robinson | 204/197 |
| 2,916,337 | A | * | 12/1959 | Fike | 428/653 |
| 3,295,173 | A |   | 1/1967 | Webber et al. | 22/57.4 |
| 3,353,934 | A | * | 11/1967 | Robinson | 428/636 |
| 3,710,844 | A |   | 1/1973 | Doi et al. | 164/461 |

(Continued)

FOREIGN PATENT DOCUMENTS

DE 844 806 7/1952

(Continued)

OTHER PUBLICATIONS

Li, Y.Y., et al., "Preparation of 2024/3003 gradient materials by semi-continuous casting using double-stream-pouring technique," *Journal of Central South University of Technology* 9(4):229-234, 2002.

(Continued)

*Primary Examiner*—Keith D. Hendricks
*Assistant Examiner*—Jason L Savage
(74) *Attorney, Agent, or Firm*—Greenberg Traurig, LLP

(57) ABSTRACT

A method of casting a multi-layered metal ingot including the steps of delivering a metallic divider member into a direct chill mold, pouring a first molten metal into the mold on one side of the divider member, and pouring a second molten metal into the mold on the other side of the divider member, and allowing the first molten metal and the second molten metal solidify to form a metal ingot which includes the divider metal layer disposed there between.

17 Claims, 12 Drawing Sheets

U.S. PATENT DOCUMENTS

| | | | |
|---|---|---|---|
| 3,807,485 A * | 4/1974 | Paton et al. | 164/496 |
| 4,071,072 A | 1/1978 | McCubbin | 164/89 |
| 4,125,674 A * | 11/1978 | Kimura et al. | 428/469 |
| 4,356,618 A | 11/1982 | Jordan | 29/527.6 |
| 4,567,936 A | 2/1986 | Binczewski | 164/453 |
| 4,660,621 A | 4/1987 | Ehlert et al. | 164/461 |
| 4,693,293 A * | 9/1987 | Yamamoto et al. | 164/99 |
| 4,726,417 A | 2/1988 | Sano | 493/3 |
| 5,077,094 A * | 12/1991 | McCall et al. | 427/319 |
| 5,240,067 A | 8/1993 | Hatch | 164/461 |
| 5,269,366 A | 12/1993 | Zeze et al. | 164/461 |
| 5,275,263 A * | 1/1994 | Mezger | 164/95 |
| 5,427,172 A | 6/1995 | Ekerot | 164/461 |
| 5,480,496 A | 1/1996 | Ward | 148/437 |
| 6,089,309 A | 7/2000 | Ge | 164/461 |
| 6,296,170 B1 * | 10/2001 | Hardwick | 228/107 |
| 6,495,269 B1 | 12/2002 | Haszler et al. | 428/610 |
| 6,503,432 B1 * | 1/2003 | Barton et al. | 264/173.16 |
| 6,527,160 B2 * | 3/2003 | Hardwick | 228/107 |
| 2001/0040180 A1 * | 11/2001 | Wittebrood et al. | 228/219 |
| 2002/0050511 A1 * | 5/2002 | Wittebrood et al. | 228/247 |
| 2002/0142185 A1 * | 10/2002 | Kilmer | 428/654 |
| 2005/0064226 A1 * | 3/2005 | Benedictus et al. | 428/654 |
| 2008/0050607 A1 * | 2/2008 | Kilmer et al. | 428/577 |

FOREIGN PATENT DOCUMENTS

| | | | |
|---|---|---|---|
| DE | 4420697 | | 12/1995 |
| DE | 19814988 | | 7/1999 |
| JP | 55068156 | | 5/1980 |
| JP | 61276746 | | 12/1986 |
| JP | 61286044 | | 12/1986 |
| WO | 98/24571 | * | 6/1998 |

OTHER PUBLICATIONS

Li, Y.Y., et al., "Preparation and tensile property of a high-strength, anticorrosion functionally graded 2024/3003 composite," *Journal of Materials Science* 39(16-17):5607-5609, 2004.

Li, Y.Y., et al., "Heat treatment of 2024/3003 gradient composite and diffusion behavior of the alloying elements," *Materials Science and Engineering* A 391:124-130, 2005.

Zhang, W. W., et al., "Double-stream-pouring technique for production of gradient materials by continuous casting," *Chinese Science Bulletin* 43(11):911-914, 1998.

Zhang, W. W., et al., "High Temperature Annealing of AlCu/Al Gradient Alloy Prepared by Semi-Continuous Casting," China, pp. 6-8, 2002. (abstract only).

Zhang, W. W., et al., "Microstructure and mechanical property of 2024/3003 gradient aluminum alloy," *Journal of Central South University of Technology* 11(2):128-133, 2004.

Zhang, W. W., et al., "Effect of plastic deformation on microstructure and hardness of AlSi/Al gradient composites," *Transactions of Nonferrous Metal Society of China* 17(6):1186-1193, 2007.

* cited by examiner

SIMULTANEOUS MULTI-ALLOY CASTING

CROSS REFERENCE TO RELATED APPLICATION

This application is a divisional of application Ser. No. 10/004,041, filed Oct. 23, 2001 now U.S. Pat. No. 6,705,384, entitled "Simultaneous Multi-Alloy Casting

BACKGROUND OF THE INVENTION

1. Field of the Invention

The present invention relates to the simultaneous casting of multiple alloys, in particular, direct chill casting of multiple aluminum alloys using a metallic member between the alloys to form a multi-component cast product and/or the use of a metallic member as an external layer on a cast ingot.

2. Prior Art

In the production of aluminum alloy ingots by a conventional direct chill (DC) casting process, molten aluminum is poured into an opened end mold. The lower end of the mold is initially closed by a platform referred to as bottom block and the molten metal pools within the mold. The bottom block is progressively lowered in step with the pouring of the molten metal. The wall of the DC mold is continuously cooled so that a solid skin of metal forms in contact with the mold wall at the level of the surface of the pool of molten metal in the mold. An example of the method of DC casting is described in U.S. Pat. No. 4,071,072, incorporated herein by reference. In this conventional operation, a single molten aluminum alloy is direct cast into an ingot.

Such aluminum ingots are often times incorporated with other alloys to form a composite product. For example, brazing sheet for the header of a heat exchanger or for reinforcement structures may be produced from an Aluminum Association (AA) 3000 series aluminum alloy with a clad layer of an AA 4000 series alloy. Evaporator sheet product or plate type heat exchangers typically include a 3000 series alloy clad on both sides with a 4000 series alloy. Likewise, radiators often are formed from a 3000 series alloy with a 4000 series cladding and water-side liner of an AA 1000, 5000, 6000, or 7000 series alloy. The clad layer is conventionally roll bonded in plate form onto an ingot of the core alloy (e.g., a 3000 series alloy). Roll bonding requires multiple rolling passes, scalping, reheating, and sealing steps to produce the clad alloy in sheet form. Each of those processes adds to the cost of the final clad product. In addition, the thickness of cladding produced via roll bonding is generally limited to a maximum of only about 35% of the total sheet thickness. Roll bonding can also be extremely difficult if the mechanical properties of the alloys being roll bonded are too dissimilar at the rolling temperatures. For example, when one alloy deforms very easily while the other alloy does not, the alloys do not seal properly or the target cladding ratio is off.

More recently, attempts have been made at casting composite metal products. One such process is described in DE 4420697 in which one alloy of a billet is DC cast on one side of a fixed barrier and another alloy is DC cast on the opposite side of the barrier. The process is controlled such that the two molten metals come in contact with one another while in the molten state to provide a controlled mixing of the two melts. In this manner, the composition of the composite billet in the direction perpendicular to the contact surface of the two metal components changes continuously. The concentration of the individual alloy elements changes continuously from the values of one alloy to the values in the other. The fixed barrier maintains the two components apart from each other within the mold, and the barrier is positioned off center so that one component is narrower than the other. The alloy closest to the mold (the narrower component) cools and solidifies earlier in the process than the other alloy, i.e., at a great height from the bottom block. The bottom block is withdrawn at a speed whereby the levels of the melts within the mold remain approximately even. Although one alloy solidifies before the other alloy, there is a small region between the melts in which the melts are able to flow into one another and mix briefly to promote adhesion between the two alloys. While this method provides some adhesion between the two components of the cast product, the mixing of the components which occurs during the casting can be detrimental to the finished product. The location and shape of the fixed barrier are also critical to avoid intermixing of the molten alloys. The properties of the alloys simultaneously cast in this manner may be affected by the mixing of the alloying components. This method also requires careful control of molten metal flow to avoid mixing due to hydraulic pressure differences as well as careful control of the solidification rate of the alloy forming the narrower component to ensure only brief mixing of the alloys in the region immediately below the barrier.

Another method of DC casting a composite ingot is disclosed in U.S. Pat. No. 4,567,936 in which an outer layer is simultaneously cast within an inner component. According to this method, the outer layer solidifies prior to contact within the molten inner alloy. This avoids mixing between the components of the inner component and the outer layer. A drawback to this method is that the outer layer must solidify completely before the inner alloy can be cast within the outer layer. The thickness of the outer layer also is limited because the heat of the inner component must exit through the outer layer to the exterior surfaces of the cast product. Hence, the configuration of the final multi-component product also is limited.

Accordingly, a need remains for a method of simultaneously casting a multi-alloy metal product with a minimum of mixing between the alloys of the product and which can produce cast metal products in a variety of configurations.

SUMMARY OF THE INVENTION

This need is met by the method of the present invention of casting a multi-layered metal ingot including the steps of delivering a metallic divider member into a direct chill mold, pouring a first molten metal into the mold on one side of the divider member and pouring a second molten metal into the mold on the other side of the divider member, and allowing the first molten metal and the second molten metal to solidify to form a metal ingot which includes the divider metal layer disposed between the two cast layers. The multi-layered metal ingot removed from the mold contains at least two cast layers including the first and second metals separated by a layer of the divider member. Alternatively, the divider member may be positioned against a wall of the mold and a single molten metal is poured into the mold to produce one cast layer bound to the divider member thereby forming an outer shell or cladding on the ingot. The divider member may be a sheet having a thickness of up to about 0.25 inch or a plate having a thickness of up to about 6 inches. The position of the divider member may be shifted within the mold to produce varying thicknesses of the cast metals. More than one divider member may be placed in the mold with molten metals poured on opposite sides of each divider member to produce a metal product having at least three cast layers separated by the divider members. The fundamental principles guiding the attainment of a strongly bonded interface between the divider member and the molten metal are identical regardless of where the divider member is located within the ingot. The divider member may also be tubular in shape. One metal is poured into the tubular divider member while another metal is poured between the tubular divider member and the mold.

The molten metals may each be an alloy of AA series 1000, 2000, 3000, 4000, 5000, 6000, 7000, or 8000. The divider member may be a solid metal that will survive exposure to the molten aluminum during the casting operation. For the purpose of maintaining a "clean" scrap loop, the divider member preferably is aluminum or an aluminum alloy or a clad aluminum product that has a solidus temperature greater than the liquidus temperatures of the alloys cast on either side thereof. It is preferred that the solidus temperature of the divider member be at least 610° C. A particularly suitable metal for the divider member is an AA 1000 series alloy. Alternatively, the divider member may be in the form of a screen alloys of iron, titanium, magnesium, copper, or nickel.

A complete understanding of the invention will be obtained from the following description when taken in connection with the accompanying drawing figures wherein like reference characters identify like parts throughout.

DETAILED DESCRIPTION OF THE PREFERRED EMBODIMENTS

Figure 1:
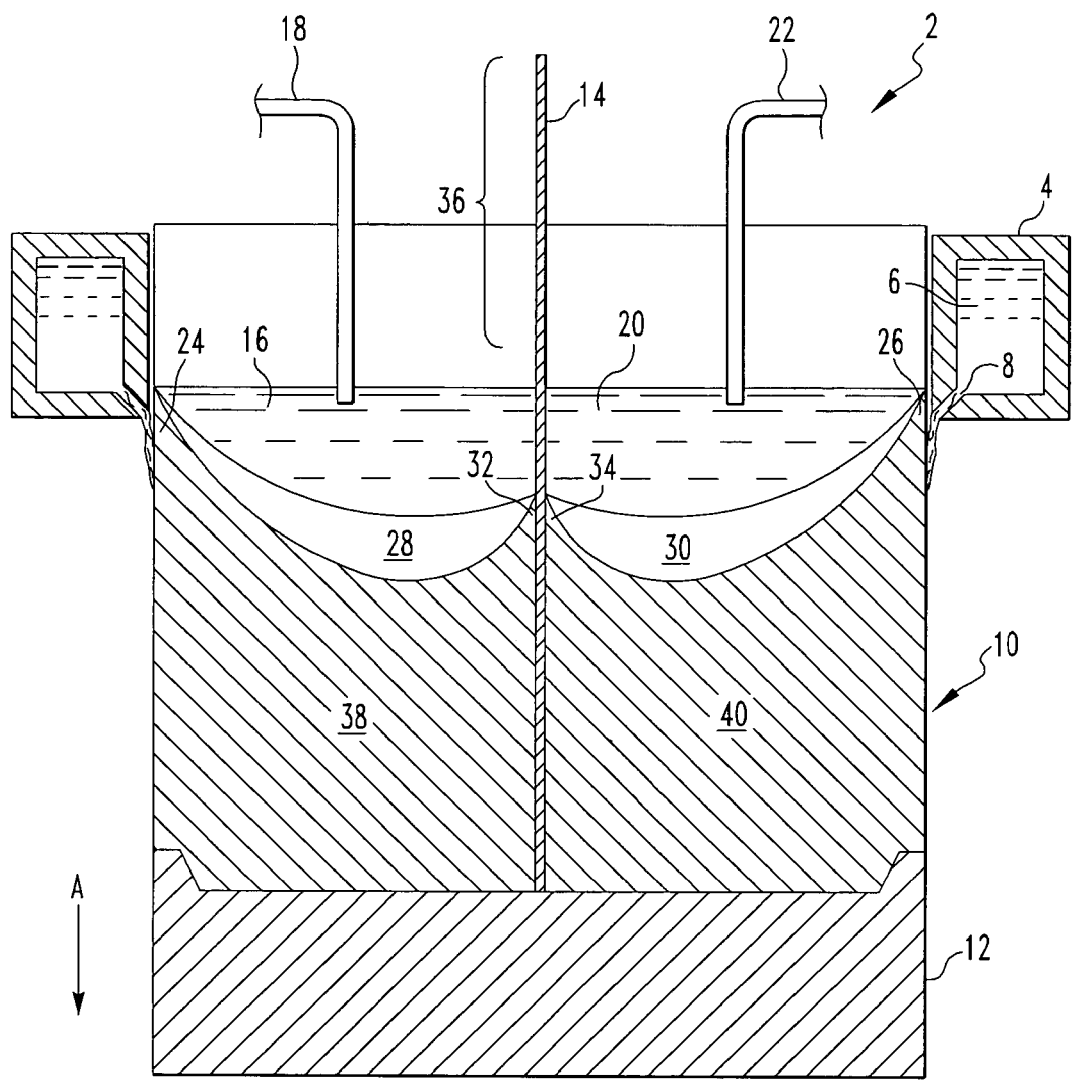
FIG. 1 is a partially sectioned schematic of an apparatus for simultaneously producing a composite metal product having two cast layers according to the present invention.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a method of casting a multi-layered metal ingot and the product produced thereby. The method of the present invention uses an apparatus 2 schematically shown in FIG. 1 which incorporates a conventional direct chill mold 4. The direct chill mold 4 defines a water chamber 6 and a slit 8 through which water is emitted directly onto the surface of an ingot 10 emerging from the mold 4. The cast ingot 10 solidifies on a bottom block 12.

A metallic divider member 14 is suspended into the mold 4 and seats on the bottom block 12. The metallic divider member 14 provides a barrier between a first molten metal 16 which is fed into the mold 4 via a first trough 18 and a second molten metal 20 fed into the mold 4 via a second trough 22. The bottom block 12 is withdrawn in the direction of arrow A while coolant (water) is applied to the surfaces of the ingot 10. Suitable speeds for the bottom block 12 are about 1 to about 6 inches per minute, preferably about 2 to about 3 inches per minute. When citing such ranges herein, the range includes all intermediate values. The divider member 14 remains in contact with the bottom block 12 and accordingly travels downwardly at the speed that the bottom block 12 travels. A crane (not shown) equipped with movable grips (e.g., wheels) may be used to suspend the divider member 14 over the apparatus 2 and deliver the divider member 14 into the mold 4. Other mechanisms may be used to suspend and deliver the divider member 14 into the mold 4.

Each of the first and second molten metals 16 and 20 solidify as generally shown in FIG. 1. The portion 24 of the metal 16 closest to the mold 4 solidifies very quickly, e.g. in less than about 10 seconds. Solidification of the metal 20 likewise occurs at a region 26 adjacent the mold 4. Semi-solid zones 28 and 30 form below the level of the respective first solidification regions 24 and 26. The metals 16 and 20 also begin to solidify adjacent the divider member 14 at respective locations 32 and 34. The locations 24, 26, 32 and 34 may be at the same height as each other or at different heights from the bottom block 12. In many cases, the melting point of the metal of the divider member 14 is less than the temperature of the incoming molten metals 16 and 20. Nevertheless, the divider member 14 does not completely melt and serves to prevent mixing of the metals 16 and 20 by acting as a heat sink and as an interface between the metals 16 and 20. Some heat from the molten metals 16 and 20 transfers into the divider member 14 and subsequently is transferred out of the portion 36 of the divider member 14 that extends up and out of the mold 4. Similarly, some of the heat transferred to the divider member 14 is also subsequently transferred out of the divider member to the solidifying ingot 10 below the molten metals 16 and 20. The divider member 14 may experience minimal melting (erosion), but this minimal amount does not affect the metallurgical properties of each of the metals 16 and 20 cast on opposing sides of a divider member 14. Upon complete solidification, the metals 16 and 20 form respective solid components 38 and 40 separated by the divider member 14.

The minimal melting of the divider member 14 provides for some mixing of the components of the divider member 14 with the components of the metal 16 on one side and with the components of the metal 20 on the other side. The minimally mixed metals solidify and thereby adhere the components 38 and 40 to the divider member 14. Superior adhesion between the divider member 14 and components 38 and 40 is achieved when the temperature of the divider member 14 reaches at least the higher of the liquidus temperature of component 38 and the liquidus temperature of component 40. It is believed that when the divider member 14 initially contacts the molten metals 16 and 20, some solidification of the metals rapidly occurs on the surfaces of the divider member 14. This temporary solidification is not shown in FIG. 1. Inherent oxides on the surfaces of the divider member 14 generally remain and become entrapped between the divider member 14 and the solidified metal. When the molten metal temperatures are sufficiently high, the divider member 14 locally reaches a temperature greater than the liquidus temperature of the metals 16 and 20 and the initially solidified metal remelts as the divider member 14 travels in the direction of the arrow A. The divider member 14 is then directly exposed to the molten metals 16 and 20 and the oxide destabilizes with some minimal melting of the divider member 14. As the divider member 14 continues downwardly, the local temperatures of the molten metals 16 and 20 decrease to their liquidus temperatures and solidification begins. The local temperatures continue to drop until the solidus temperatures are reached and the alloys fully solidify resulting in strong bonds between the components 38 and 40 and the respective sides of the divider member 14.

Alternatively or in addition thereto, flux may be applied to one or both sides of the divider member 14. The flux may be applied to the divider member 14 directly (e.g. by coating the surfaces of the divider member 14 with flux) or flux may be applied to the upper surfaces of the molten metals 16 and 20 that pool in the mold 4. Immediately prior to contact between the divider member 14 and the molten metals 16 and 20, the flux melts and chemically reduces oxides on the divider member 14 which could otherwise interfere in the adhesion of the molten metals 16 and 20 to the divider member 14. Suitable flux includes potassium aluminum fluoride based fluxes (e.g. Nocolok®) along with but not limited to fluxes based on cesium-potassium aluminum fluoride based fluxes and cesium fluoroaluminate based fluxes. The flux may be any material capable of removing the oxide layer by chemical reaction prior to contact of the molten metals 16 and 20 with the divider member 14. When flux is used, lower molten metal temperatures should be used during casting to reduce the risk of melting the divider member 14 yet achieve strong adhesion of the components 38 and 40 to the divider member 14.

Figure 2:
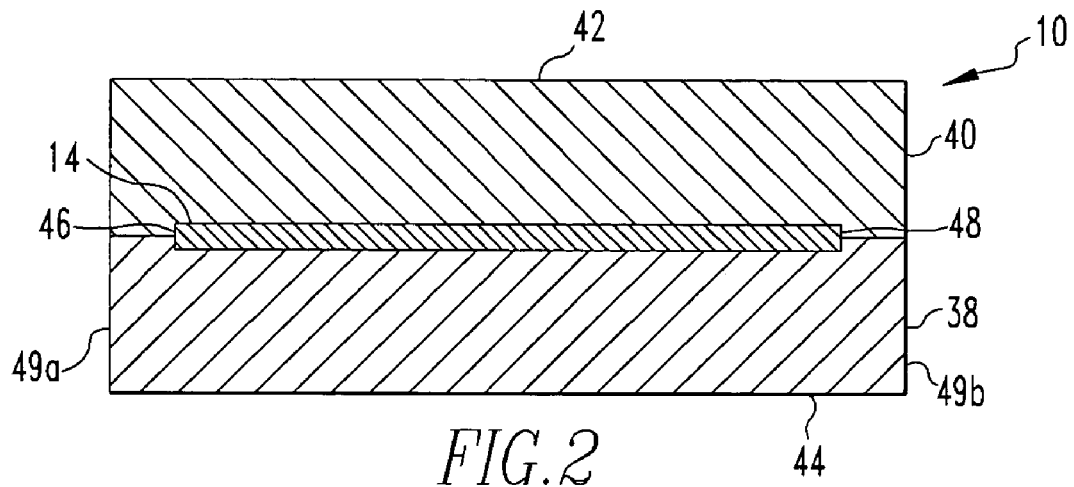
FIG. 2 is a cross-section of the metal product produced in the apparatus shown in FIG. 1.

A cross section of the ingot 10 produced in the apparatus 2 is shown in FIG. 2. The ingot 10 is depicted as having a rectangular configuration with the divider member 14 positioned centrally between the layers of components 38 and 40. However, the divider member 14 may be positioned off-center and may be as close as about 0.5 inch from side surfaces 42 and 44 of the ingot 10. The divider member 14 has a width between edges 46 and 48 thereof which is slightly smaller than the width of the ingot 10 between edges 49a and 49b. Edges 46 and 48 preferably are positioned about 0.1 to about 3 inches from the mold 4 and are shown not to scale in FIGS. 2 and 6-8. The cooling rates are highest near the surface of the ingot 10, and the molten metals 16 and 20 rapidly solidify at the surface of the ingot. The rapid solidification of molten metals 16 and 20 around the edges 46 and 48 minimizes opportunities for mixing of the molten metals 16 and 20. Nevertheless, some minimal mixing may enhance adhesion of the solid components 38 and 40 together. In any event, the edges 49a and 49b of the ingot 10 are typically trimmed off during rolling to eliminate edge cracking so these areas of intermixing around the edges 46 and 48 of the divider member 14 generally are discarded.

The thickness of the divider member 14 may range between about 0.07 inch to about 0.25 inch (referred to as a sheet) or over about 0.25 inch to about 6 inches thick (occasionally referred to as a shlate when up to one inch thick and generally referred to as a plate when up to 6 inches thick). The thickness of the divider member 14 preferably is about 0.5 to about 6% of the thickness of the ingot 10, more preferably about 1 to about 3% of the thickness of the ingot 10. A thinner divider member 14 may be used when the risk of melting of the divider member 14 is low and/or the desired metallurgical or structural properties of the ingot 10 dictate that the layer 14 has a minimal thickness. Conversely, a thicker divider member 14 may provide a more significant barrier to mixing of the molten metals 16 and 20 and may serve as one layer in a multi-layered ingot.

If the divider member 14 transfers heat too rapidly out of the solidifying metals 16 and 20, the resultant components 38 and 40 may be prone to cracking. Hence, when the divider member 14 is over about 0.25 inch thick, it may be desirable to preheat the divider member 14 to within about 400° C. of the temperature of the molten metals 16 and 20 thereby reducing the rate of heat transfer through the divider member 14.

Generally, the divider member 14 has a melting point of at least 610° C. The divider member 14 may be an aluminum alloy and preferably contains at least about 97% aluminum and has a high solidus temperature such as an AA 1000 series alloy. Other suitable materials for the divider member 14 are composite products containing layers of aluminum alloys, stainless steel, nickel alloys, titanium alloys, magnesium alloys and combinations thereof that are clad, plated or coated thereto. The chemistry of the divider member 14 may be selected to improve the corrosion resistance of the final product being cast. For example, the addition of Zn to the divider member 14 makes the divider member 14 more electrochemically negative than at least one of the components 38 and 40. This results in galvanic protection, whereby the Zn enriched areas (the divider member 14 and the portion of components 38 and 40 into which Zn has diffused) sacrificially protect the more cathodic alloys of components 38 and 40. The divider member 14 may define a plurality of small holes to allow some wetting between the molten metals 16 and 20 without significant intermixing. Alternatively, the divider member 14 may be a screen produced from iron, titanium, molybdenum or alloys thereof. Suitable screens are 14×18 mesh about 0.01 inch thick or 32×32 mesh about 0.006 inch thick.

The molten metals 16 and 20 each may be the same or different and each is preferably an aluminum alloy and may be an alloy of the AA series 1000, 2000, 3000, 4000, 5000, 6000, 7000, or 8000. Other suitable metals may include magnesium alloys. For products in which one of the molten metals requires a specialized alloy, the other molten metal may have a high scrap alloy content. The low value scrap metal may be simultaneously cast with a thinner layer of the specialized alloy to produce high value products with a specialized surface such as reflector sheet, anodized products, architectural products and the like.

The temperature of the first molten metal 16 may be about equal to the temperature of the second molten metal 20, or the temperatures of the first and second molten metals 16 and 20 may differ by up to about 150° C. Selection and control of the temperatures of the molten metals 16 and 20 during casting is critical, particularly when flux is not used. When no flux is used to remove the oxide on the divider member 14, the selection of molten metal temperatures should be such that the temperature of the divider member 14 rises above the liquidus temperature of the molten metals 16 and 20.

When a flux is used or when the material of the divider member 14 is selected such that the oxide is disrupted prior to contacting the molten metals 16 and 20 or when the presence of an oxide on the surfaces of the divider member 14 is not detrimental to achieving a strong bond, lower molten metal temperatures may be used and the divider member 14 does not necessarily need to reach the liquidus temperatures of the molten metals 16 and 20. In fact, it is desirable that the divider member 14 does not reach the liquidus temperature(s) because the divider member 14 remains protected from the molten metals 16 and 20 by the metal that initially solidifies onto the divider member 14. In any case, the molten metal temperatures cannot be so high as to cause complete melting of the divider member 14. Some melting of the divider member 14 is acceptable, but complete melting of the divider member 14, even locally (i.e. a "burn through"), is undesired. The temperatures for this process depend on the chemistries of the molten metals 16 and 20 and of the divider member 14.

Figure 4:
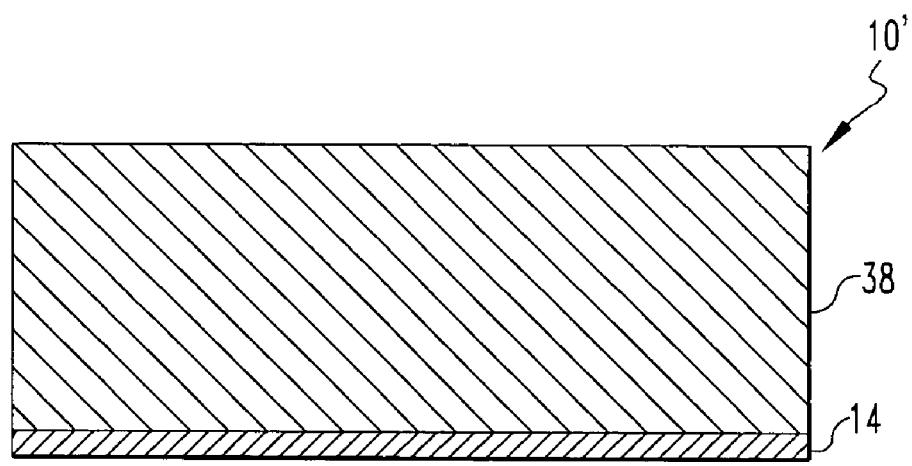
FIG. 4 is a cross-section of the metal product produced in the apparatus shown in FIG. 3.
Figure 3:
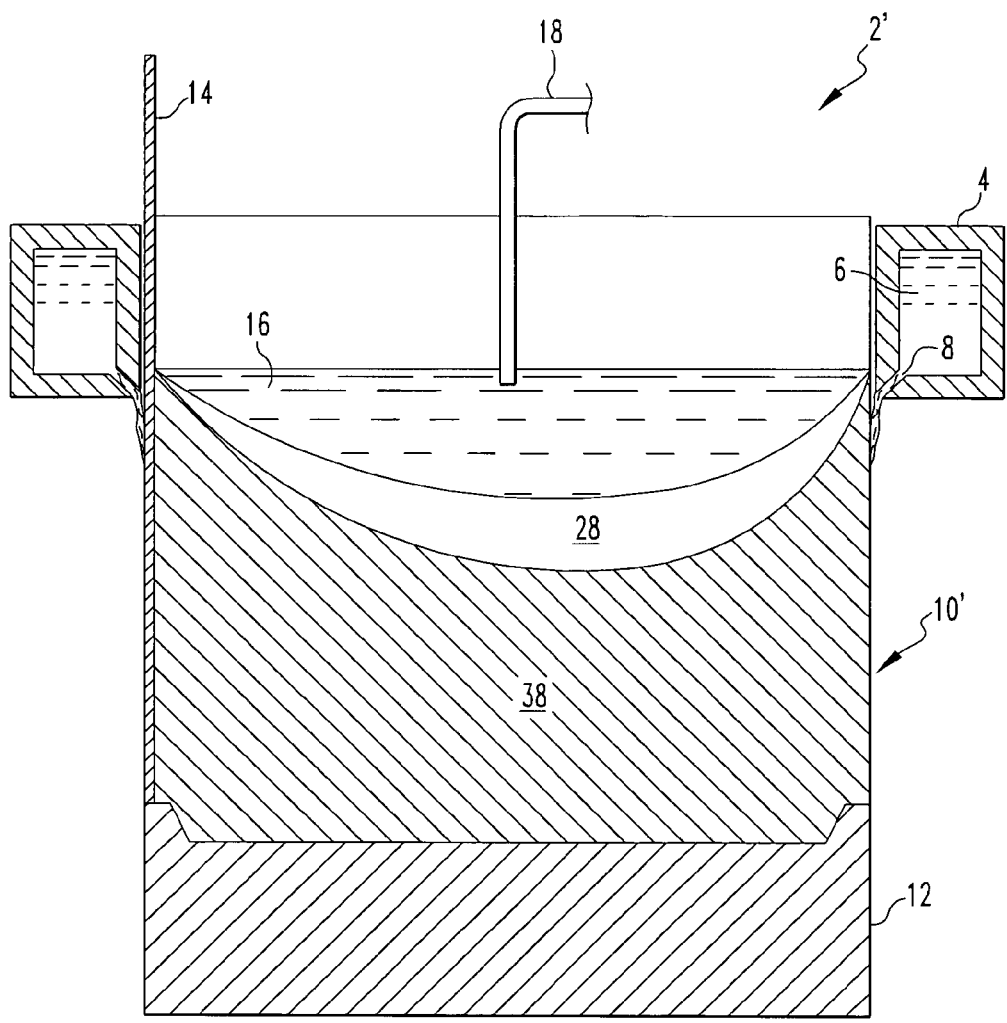
FIG. 3 is a partially sectioned schematic of an apparatus for producing a composite metal product having one cast layer according to another embodiment of the present invention.

Referring to FIGS. 3 and 4, the present invention may also be used to produce a composite ingot having a single cast layer with a layer of divider metal. In system 2', the divider member 14 may be delivered into the mold 4 at a location adjacent to the wall of the mold 4 and the molten metal 16 is delivered into the mold 4 via the trough 18. The metal 16 begins to solidify in semi-solid zone 28 and ultimately solidifies as component 38 bound to the divider member 14 in manner similar to the solidification of metal 16 described above to yield an ingot 10'. This embodiment of the invention allows for production of an ingot 10' having a solid layer 14 bound to a cast layer 38 which avoids the prior art roll bonding processes. Flux may be applied to the surface of the divider member 14 which contacts the molten metal 16 in the system 2' or to the surface of pool of molten metal 16 as described above. The divider member 14 and component 38 of the ingot 10' may be selected from the same materials listed above for ingot 10.

Figure 5:
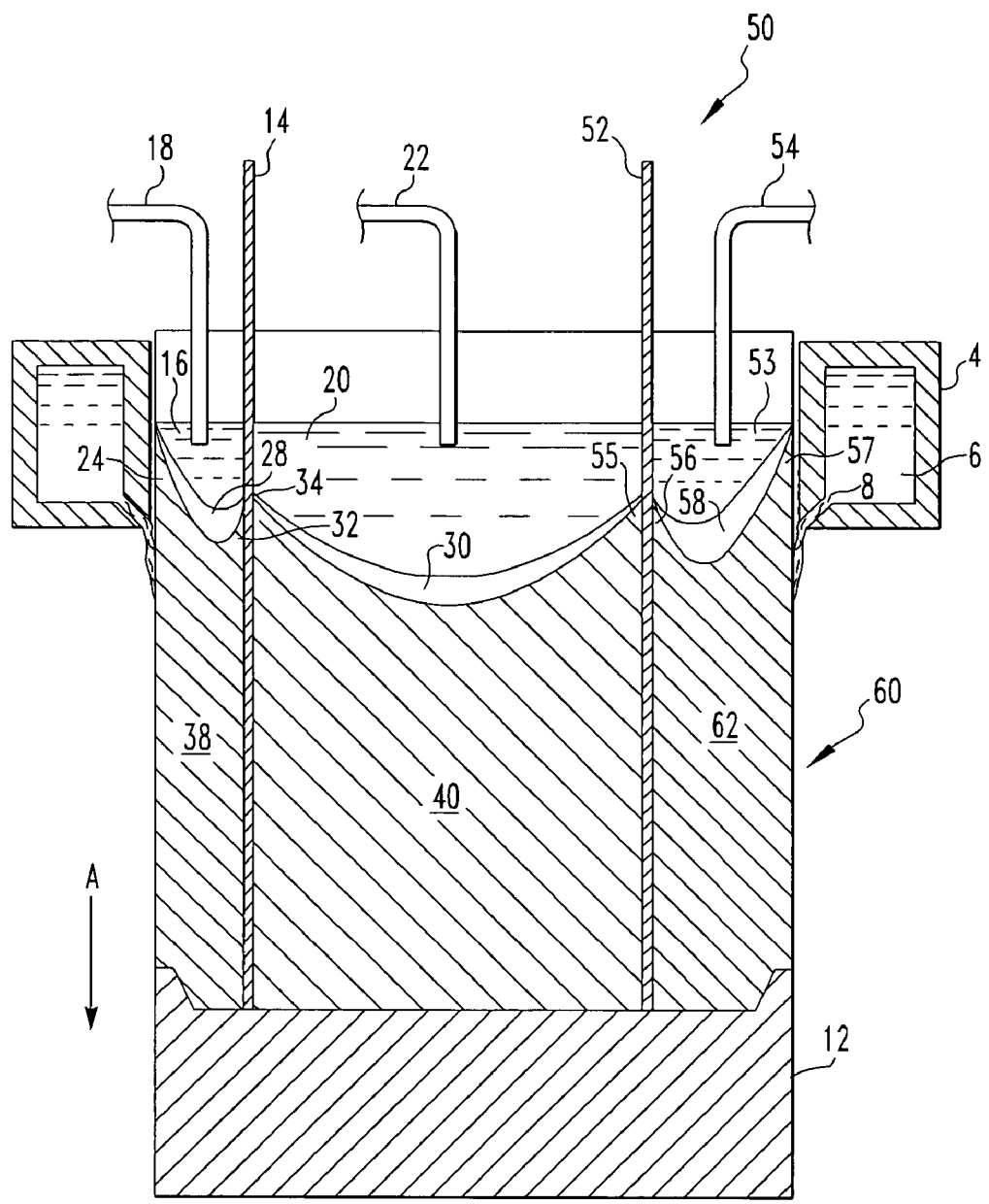
FIG. 5 is a partially sectioned schematic of a device for simultaneously producing a composite metal product having three cast layers according to the present invention.
Figure 6:
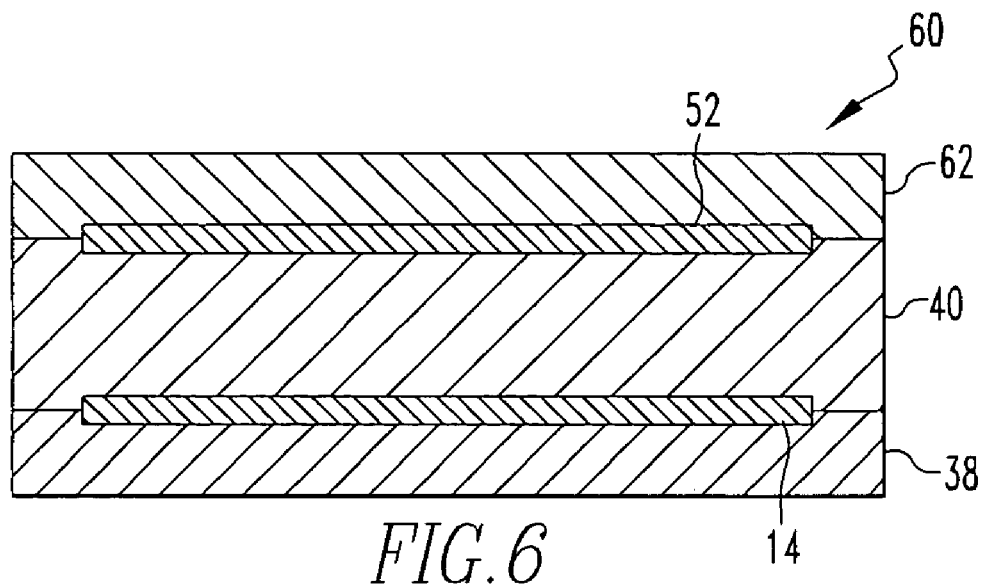
FIG. 6 is a cross-section of the metal product produced using the device shown in FIG. 5.

The method of the present invention may also be used to cast more than two molten metals. For example, in the apparatus 50 shown in FIG. 5, two divider members 14 and 52 may be delivered into the direct chill mold 4 while molten metals 16, 20, and 53 are delivered into the mold via respective troughs 18, 22, and 54. Casting of an ingot 60 from three separate molten metals 16, 20, and 53 is performed in a manner similar to that described above. The molten metal 16 solidifies first at locations 24 (adjacent the mold 4) and 32 (adjacent the divider member 14), while molten metal 20 solidifies first at locations 34 (adjacent the divider member 14) and location 55 (adjacent the divider member 52). Molten metal 53 first solidifies at location 56 (adjacent the divider member 52) and location 57 (adjacent the mold 4). The solidifying metals 16, 20, and 53 form respective semi-solid zones 28, 30 and 58. The locations 24, 32, 34, 55, 56, and 57 may be at the same height as each other or at different heights from the bottom block 12. The resultant product includes three cast layers 38, 40, and 62 separated from each other by divider members 14 and 52 as shown in FIG. 6. The divider members 14 and 52 are positioned within the mold in the embodiment of FIG. 5 similar to divider member 14 of FIG. 1. The distance between the divider members 14 and 52 is selected based on the desired thicknesses of the components 38, 40, and 62 in the ingot 60 and the size of the mold 4. The embodiment shown in FIGS. 5 and 6 relates to simultaneous casting of three alloys with divider layers interspersed between, thereby creating a five-layer product. This is not meant to be limiting. More than three alloys may be simultaneous cast according to the present invention in rectangular configurations or in other configurations by using other shapes for the mold (e.g. square or oval) and non-planar divider members.

Figure 7:
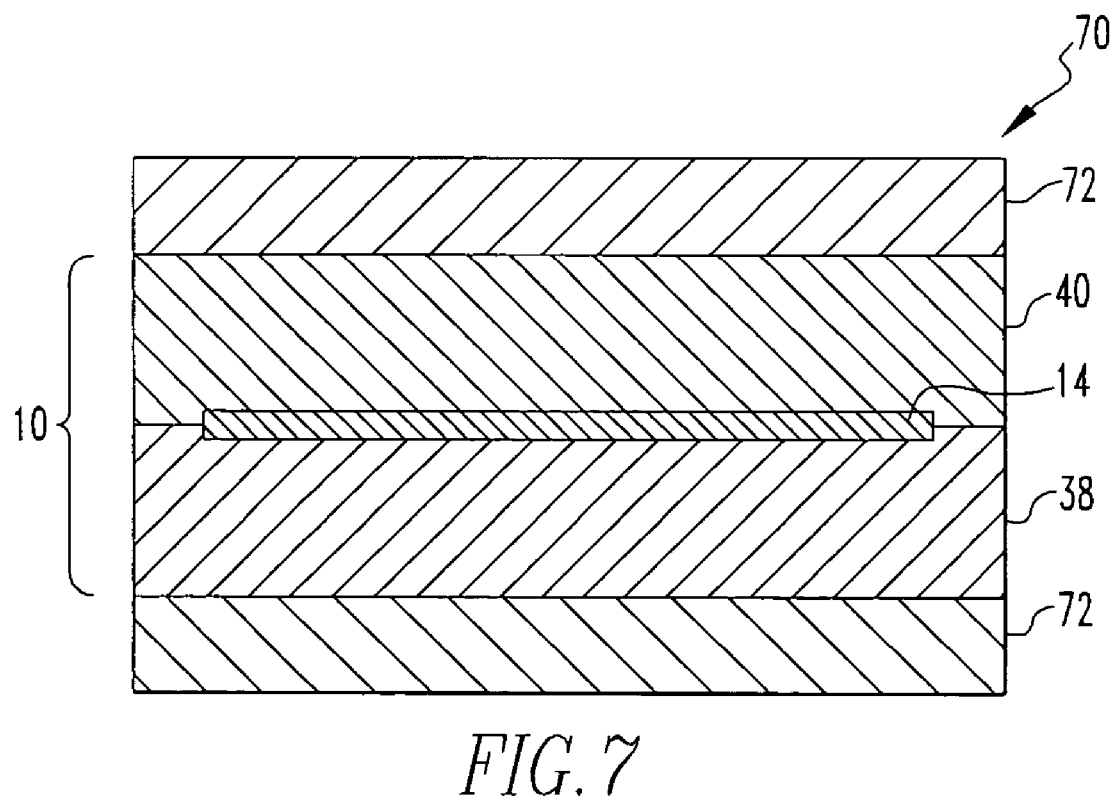
FIG. 7 is a cross-section of the metal product produced in the device shown in FIG. 1 with additional layers roll bonded thereto.
Figure 8:
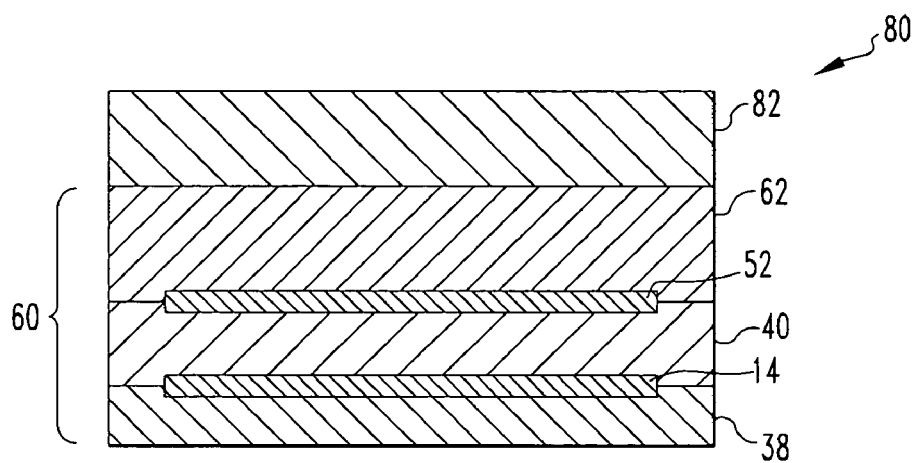
FIG. 8 is a cross-section of the metal product produced in the device shown in FIG. 5 with a layer roll bonded thereto.

Additional layers of metal may be bonded to the cast multi-layered ingots 10 and 60 resulting in the products 70 and 80 shown in FIGS. 7 and 8. Product 70 includes the ingot 10 and a pair of metal layers 72 roll bonded to the ingot 10. Product 80 includes the ingot 60 with a metal layer 82 roll bonded thereto. Products 70 and 80 each may have one or two respective layers 72 or 82. When two layers 72 are included as shown in FIG. 7, the metal of those layers may be the same or different from each other. The layers 72 and 82 may also be multi-component products produced according to the present invention or produced by conventional roll bonding practices.

Figure 9:
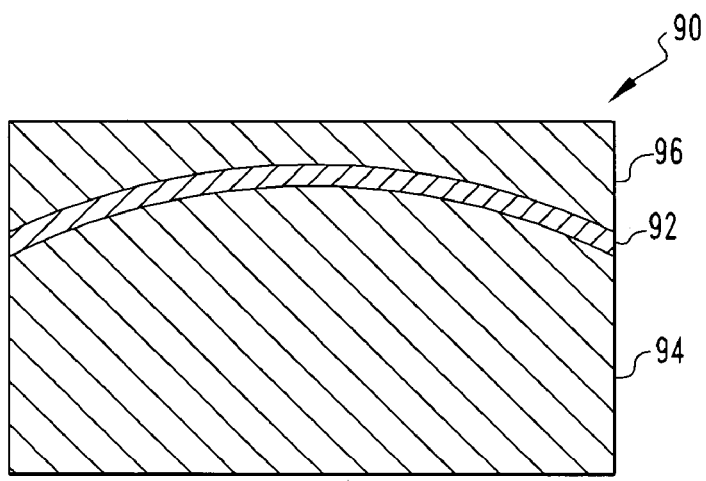
FIG. 9 is a cross-section of the metal product produced according to the present invention wherein the thickness of the layers of the composite product is not constant across the width of the product.
Figure 10:
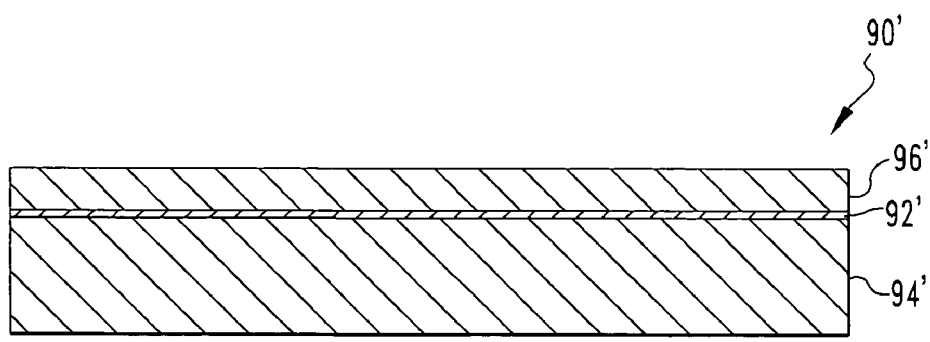
FIG. 10 is a cross-section of the metal product of FIG. 9 following a rolling step.

One of the advantages of the present invention is borne out when a multi-layered metal ingot produced according to the present invention is subsequently rolled, for example, into a plate or sheet product. In conventional roll bonded ingots, the thickness of a clad layer at the ends of the ingot oftentimes becomes unacceptably thin during the rolling process. The edges of the resulting coil made from the composite ingot must be trimmed and scrapped so that the clad layer is uniformly thick across the width of the coil. Edge trimming of about 4 inches (for about 3-5% cladding) to about 8 inches (for about 10-15% cladding) is typical for conventional roll bonded brazing sheet. Such scrap losses can be minimized in the present invention by producing an ingot 90 as shown in FIG. 9 which has an arcuately shaped divider member 92 with metals 94 and 96 cast on opposing sides thereof. The cast metal 96 (corresponding to a conventional clad layer) is thickest at the edges of the ingot 90. Upon rolling the ingot 90 to a plate 90', the divider member 92' flattens and the cast metals 94' and 96' are substantially uniformly thick as shown in FIG. 10. The divider member 92 may be tapered or bent into other configurations to locally achieve differing thickness of the metals cast on opposing sides thereof.

Figure 11:
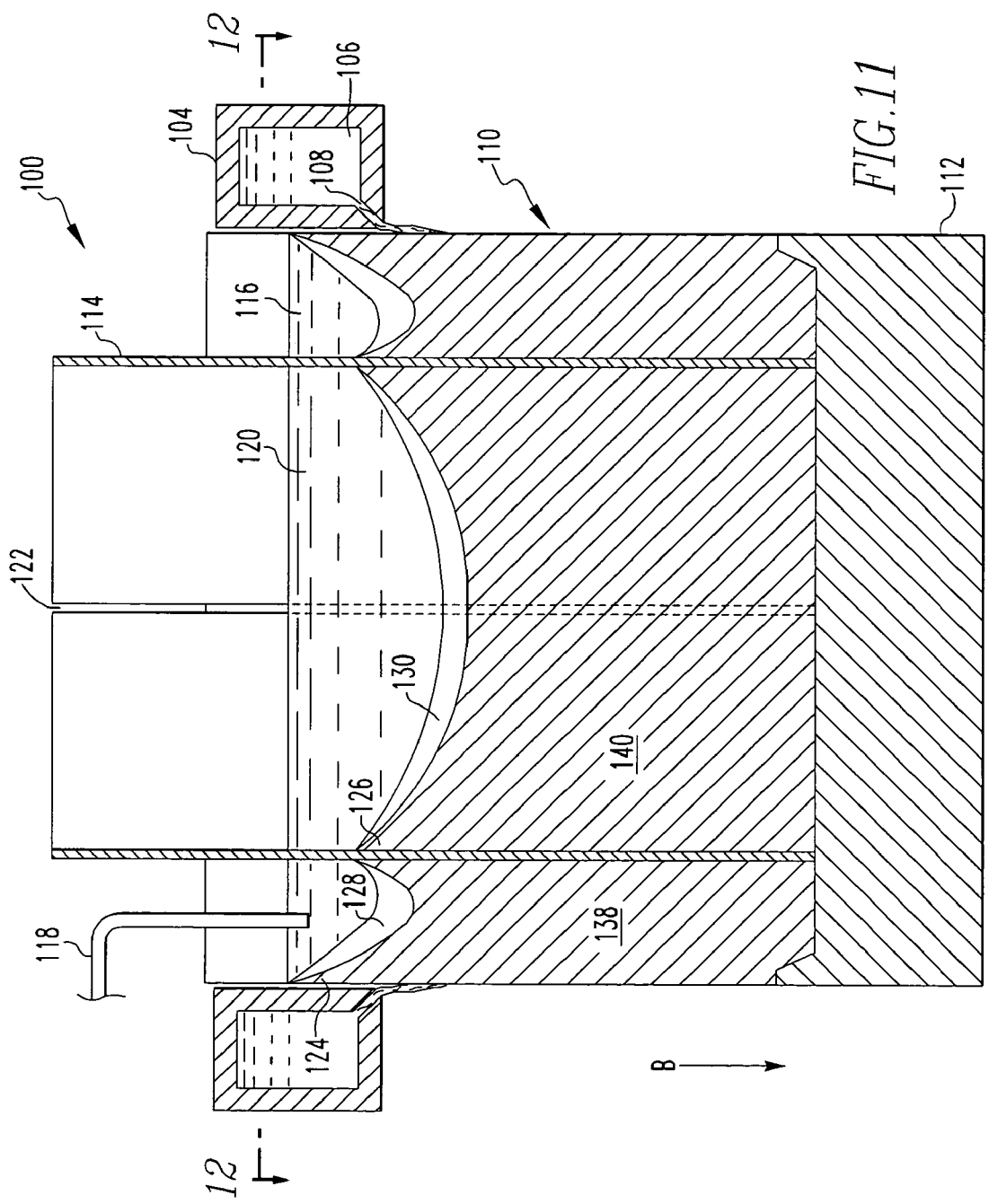
FIG. 11 is a partially sectioned schematic of another device for simultaneously casting multiple alloys to produce a billet using a tubular divider member.
Figure 12:
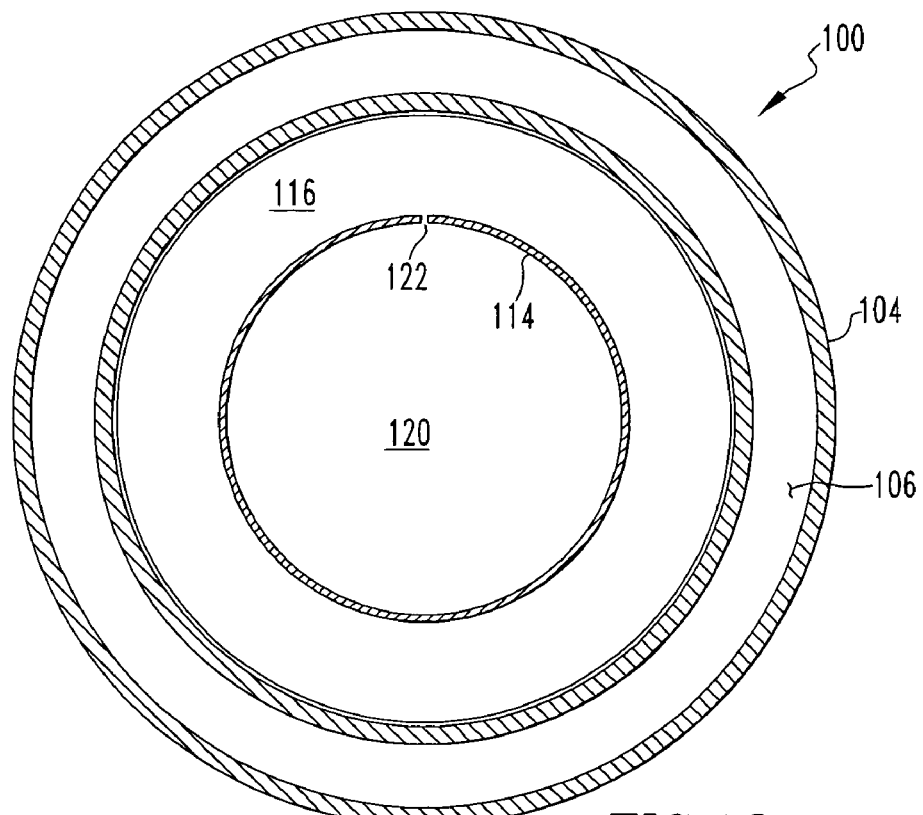
FIG. 12 is a cross-section of the device shown in FIG. 11 taken along lines 12-12.
Figure 13:
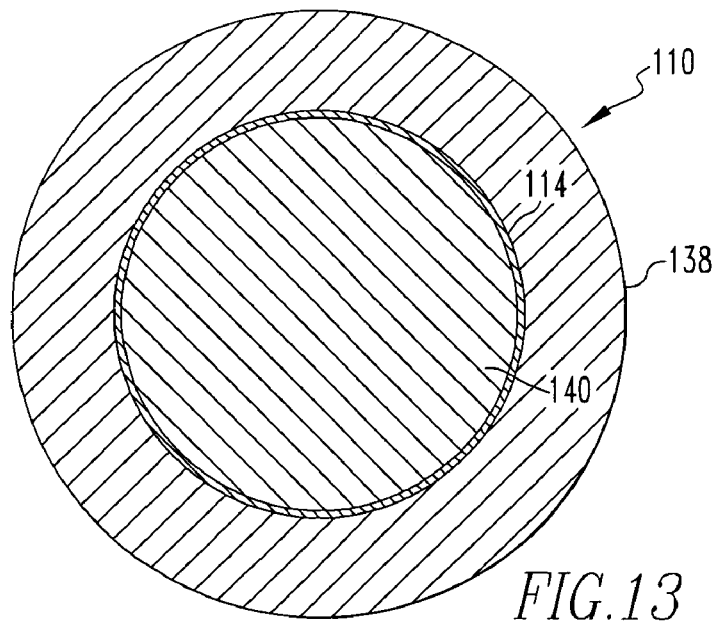
FIG. 13 is a cross-section of the billet produced in the device shown in FIG. 11.

The present invention may also be used to produce cylindrical products (e.g., a billet) of multiple alloys. The embodiment of the invention shown in FIGS. 11 and 12 includes an apparatus 100 having a cylindrical mold 104 defining a water chamber 106 and a slit 108 through which water is emitted directly onto the surface of an ingot 110 emerging from the mold 104. The cast ingot 110 seats on a circular bottom block 112 traveling in the direction of arrow B. A tubular divider member 114 is fed into the mold 104 and acts as a barrier between molten metal 116 fed from trough 118 on the outside of the tubular divider member 114 and molten metal 120 fed from another trough (not shown) on the inside of the tubular divider member 114. Delivery of the divider member 114 and movement of the bottom block 112 are controlled as described above regarding the apparatus 2. The tubular divider member 114 may define a longitudinal slot 122 to ease access of the molten metal 120 into the divider member 114 during casting. Particularly during startup, the molten metal 120 may be delivered into the tubular divider member 114 via the slot 122 near the bottom block 112 instead of pouring the molten metal 120 into the tubular divider member 114 which can result in turbulence of the molten metal 120. The slot 122 is sufficiently narrow (e.g. about 1 to about 20 inches wide, depending on the size of the billet being cast) and may extend down into the molten pools of metals 116 and 120 to prevent excessive mixing between the molten metals 116 and 120 in the vicinity of the slot 122. Molten metal 116 first solidifies adjacent the mold 104 at region 124 and molten metal 120 first solidifies adjacent the tubular divider member 114 at region 126. An annular semi-solid zone 128 forms below the level of the first solidification region 124, and a cylindrical semi-solid zone 130 forms below the level of the region 126. Upon complete solidification, the metals 116 and 120 form respective solid components 138 and 140 separate by the tubular divider member 114. A cross-section of the billet 110 produced in the apparatus 100 is shown in FIG. 13.

The present invention provides significant improvements over conventional clad products. The cladding ratio of roll bonded products is generally a maximum of 35%, i.e. the interface between roll bonded layers can generally be no greater than about 35% of the distance from either face of the ingot. In the present invention, the only limitation on the location of cast layers is that a cast layer is at least about 1 inch thick to allow for distribution of molten metal across the width of the ingot. The alloys which may be bonded together using the present invention are much more numerous than those which may be reliably and/or economically roll bonded together. Product quality is improved in the elimination of roll bonding blisters. The productivity of a hot mill used to initially breakdown or roll an ingot produced according to the present invention is also significantly increased as the many sealing passes may be eliminated.

Although the invention has been described generally above, the following particular examples give additional illustrations of the products and process steps typical of the present invention.

EXAMPLES 1-3

In each of Examples 1-3, a sheet of AA 1350 (20 inches wide, 0.375 inch thick, and 24 inches long) was positioned in the center of 12 inch×22 inch mold spanning the width with a gap of about 1 inch between the edge of the sheet and the mold walls. In each Example, a melt A of the alloy listed in Table 1 was poured into the mold on one side of the sheet and a melt B of the alloy B listed in Table 1 was poured into the mold on the other side of the sheet. In Example 3, flux was applied to the side of the sheet which contacted melt A. The metals were cast on opposing sides of the sheet while the bottom block with sheet seated thereon was lowered at a rate of 2.75 inches per minute. A 12 inch×22 inch×about 42 inch ingot having sheet of AA 1350 bonded between a layer of alloy A and a layer of alloy B was produced.

TABLE 1

| | Melt A | | Divider | Melt B | |
|---|---|---|---|---|---|
| Example | AA Alloy | Temp. (° C.) | Sheet AA alloy | AA alloy | Temp. (° C.) |
| 1 | 3003 | 671* | 1350 | 7051** | 667 |
| 2 | 3003 | 664 +/− 3 | 1350 | 3005 | 679 +/− 3 |

TABLE 1-continued

| | Melt A | | Divider | Melt B | |
|---|---|---|---|---|---|
| Example | AA Alloy | Temp. (° C.) | Sheet AA alloy | AA alloy | Temp. (° C.) |
| 3 | 3003 | 663 +/− 5 | 1350 with flux on side of melt A | 4343 | 647 +/− 4 |

*Temperature range not measured continuously in Example 1, and no mean +/− standard deviation recorded.
**Melt B of Example 1 was near AA7051, but did not conform to true AA7051 limits.

Figure 14:
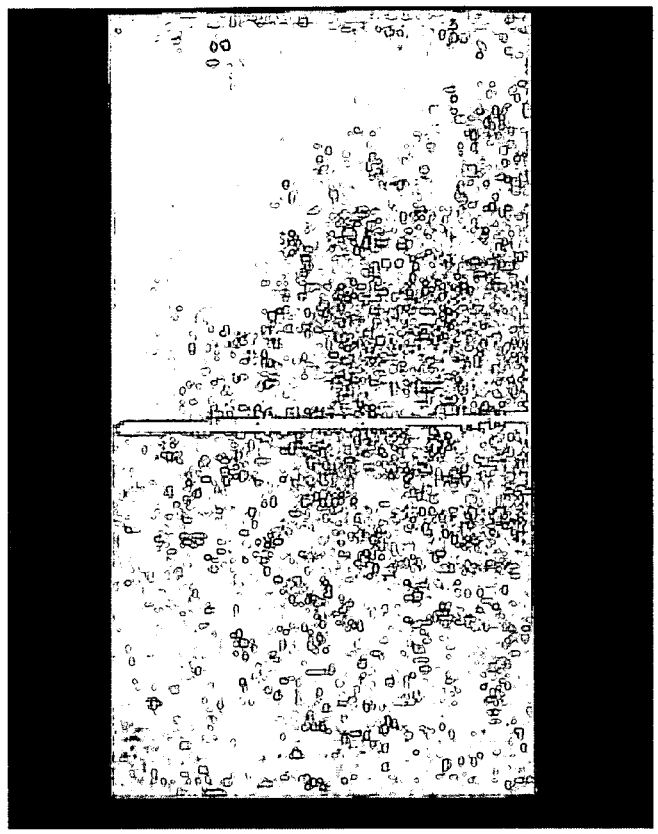
FIG. 14 is a photograph of a cross-section of an ingot produced according to the present invention.
Figure 15:
FIG. 15 is a photomicrograph of a portion of the ingot shown in FIG. 14.
Figure 16:
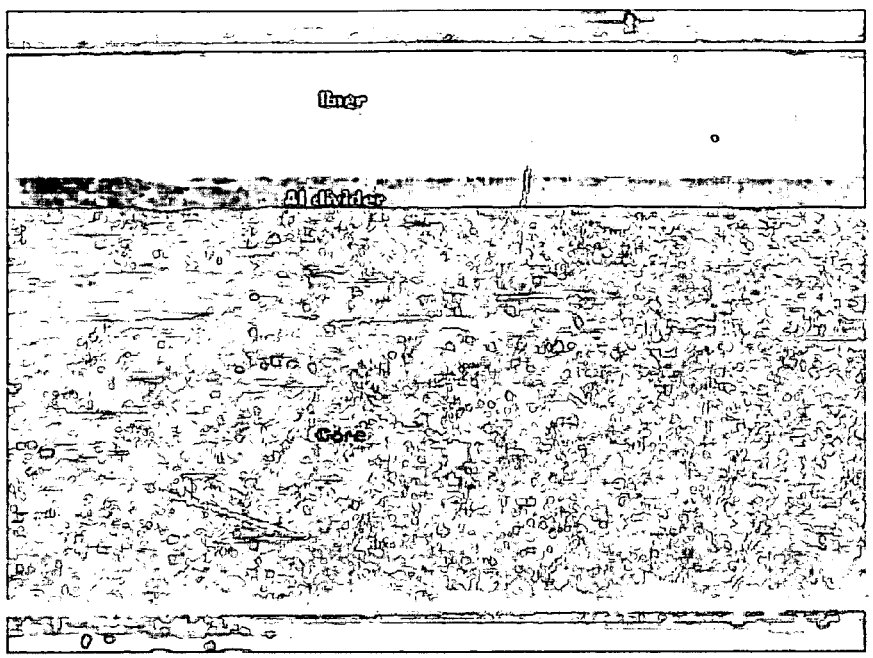
FIG. 16 is a photomicrograph of a portion of the ingot shown in FIG. 14 after hot rolling.
Figure 17:
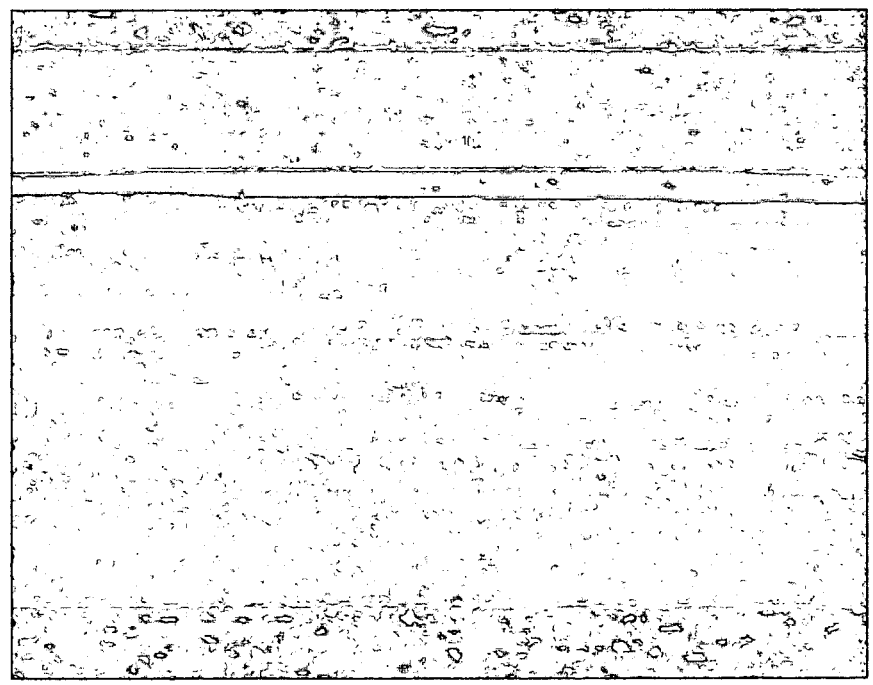
FIG. 17 is a photomicrograph of the portion of the ingot shown in FIG. 16 after cold rolling.

A block was sectioned from the ingot of Example 1 and was rolled (hot and cold) without any delaminating along the interface between the AA 1350 sheet and the cast layers of AA 3003 and 7051. A photograph of a horizontal cut through the ingot appears in FIG. 14. A close-up photomicrograph of the interface between the layers of AA alloy 3003 and modified AA alloy 7051 showing minimal erosion of the sheet appears in FIG. 15. A portion of the ingot was hot rolled to 0.250 inch (shown in FIG. 16) and subsequently cold rolled to 0.005 inch (shown in FIG. 17).

Figure 18:
FIG. 18 is a photograph of a cross-section of another ingot produced according to the present invention.

A photograph of a horizontal cut through the ingot produced in Example 2 appears in FIG. 18.

Figure 19:
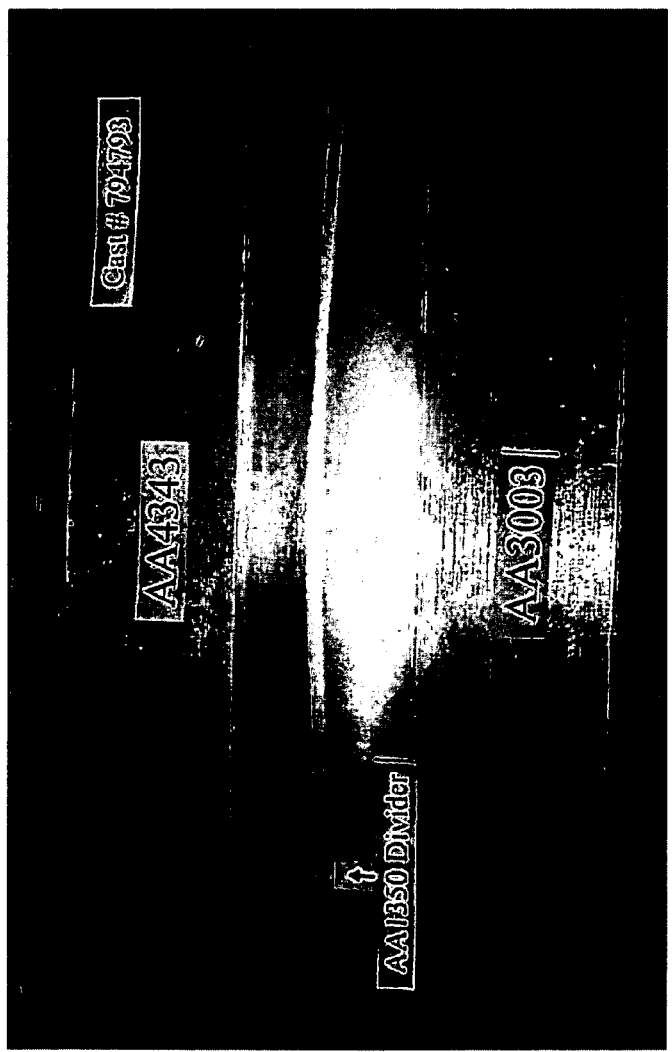
FIG. 19 is a photograph of a cross-section of yet another ingot produced according to the present invention.
Figure 20:
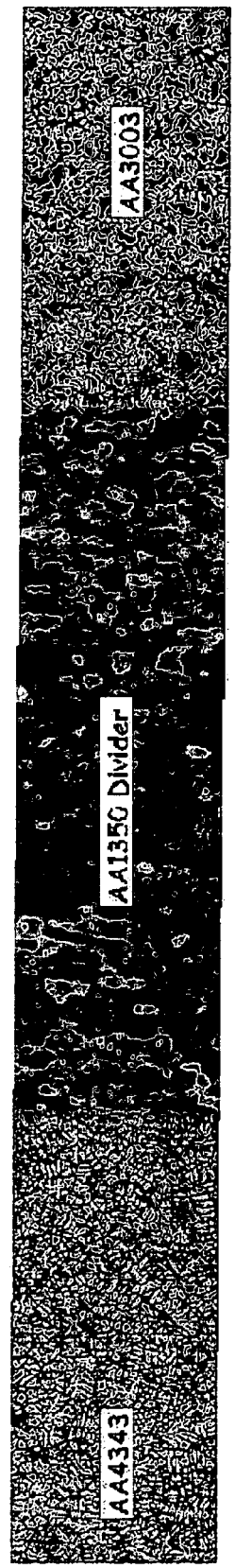
FIG. 20 is a photomicrograph an interface between the layers of another ingot produced according to the present invention.

A photograph of a horizontal cut through the ingot produced in Example 3 appears in FIG. 19. Example 3 was repeated without flux and a photomicrograph of the AA3003/AA1350/AA4343 interface is shown under polarized light in FIG. 20 after etching in barkers etch to illustrate the microstructural details of the interface.

What is claimed is:

1. A multi-layered rolled aluminum product comprising:
    (i) at least two distinct aluminum layers, wherein a first distinct aluminum layer has a different composition than a second distinct aluminum layer;
    (ii) wherein the multi-layered rolled aluminum product is made by a process comprising:
    (A) direct chill casting a multi-layered slab, the direct chill casting process comprising:
        (1) flowing a first molten aluminum alloy in a direct chill casting apparatus;
        (2) providing an aluminum barrier layer;
        (3) flowing a second molten aluminum alloy into a direct chill casting apparatus,
        (4) wherein the second molten aluminum alloy has a different composition than the first molten aluminum alloy,
        (5) wherein the aluminum barrier layer prevents the first molten aluminum alloy from intermixing with the second molten aluminum alloy;
        (6) forming the first distinct aluminum layer from the first molten aluminum alloy; and
        (7) forming the second distinct aluminum layer from the second molten aluminum alloy; and
    (B) rolling the multi-layered slab to form the multi-layered rolled aluminum product.

2. The product of claim 1, wherein the aluminum barrier layer comprises the same composition as the first molten aluminum alloy.

3. The product of claim 2, wherein the providing step comprises establishing the aluminum barrier layer, and wherein the direct chill casting processes comprises minimally melting the aluminum barrier layer.

4. The product of claim 3, wherein the minimally melting step comprises destabilizing oxides of the aluminum barrier layer.

5. The product of claim 3, wherein the aluminum barrier layer is a first aluminum barrier layer, wherein the direct chill casting comprises:
   flowing a third molten aluminum alloy into the direct chill casting apparatus;
   providing a second aluminum barrier layer; and
   forming a third distinct aluminum layer;
wherein the second aluminum barrier layer prevents the third molten aluminum alloy from intermixing with at least one of the first and second molten aluminum alloys, and wherein the multi-layered slab includes the first, second and third distinct aluminum layers.

6. The product of claim 5, wherein the second aluminum barrier layer comprises the same composition as at least one of the first and second molten aluminum alloys.

7. The product of claim 6, wherein the second aluminum barrier layer comprises the same composition as the first aluminum barrier layer.

8. The product of claim 5, wherein the second aluminum barrier layer comprises a different composition than the first aluminum barrier layer.

9. The product of claim 5, wherein the third molten aluminum alloy has a different composition than at least one of the first and second molten aluminum alloys.

10. The product of claim 9, wherein the third distinct aluminum layer has a different composition than at least one of the first and second distinct aluminum layers.

11. The product of claim 5, wherein the third molten aluminum alloy has the same composition as at least one of the first and second molten aluminum alloys.

12. The product of claim 11, wherein the third distinct aluminum layer has the same composition as at least one of the first and second distinct aluminum layers.

13. The product of claim 3, wherein the multi-layered rolled aluminum product is brazing sheet.

14. The product of claim 13, wherein the brazing sheet is included in a heat exchanger.

15. The product of claim 3, wherein the multi-layered rolled aluminum product is included in an architectural product.

16. The product of claim 3, wherein the multi-layered rolled aluminum product is a reflector sheet.

17. The product of claim 3, further comprising:
   anodizing the multi-layered rolled aluminum product to form an anodized multi-layered rolled aluminum product.

* * * * *